Figure 1:
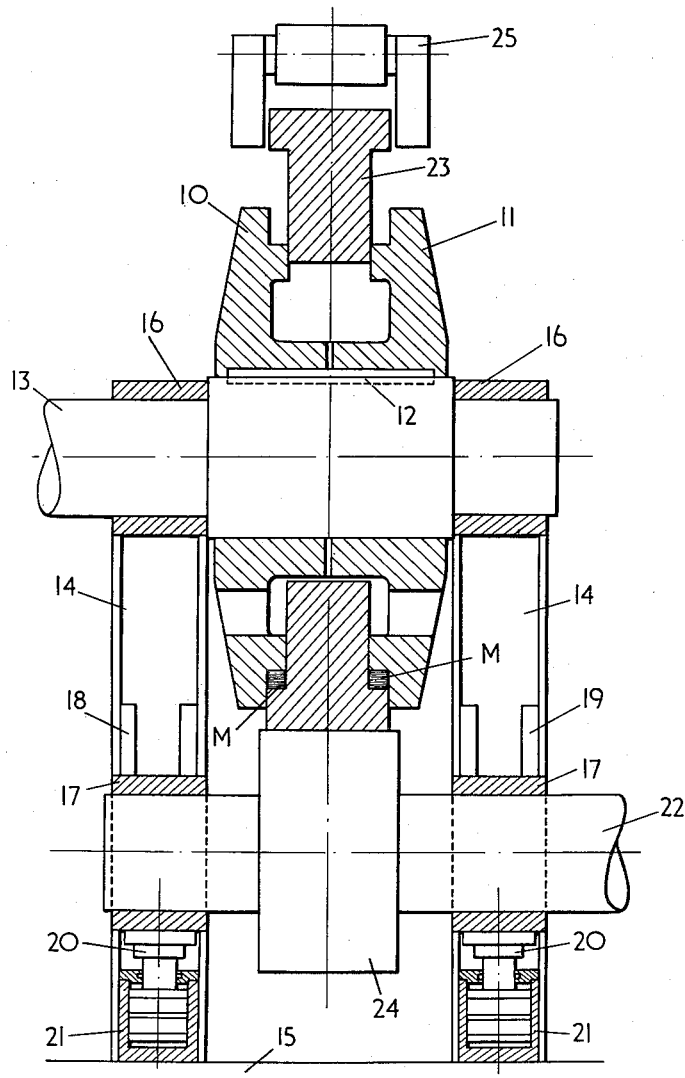

Jan. 3, 1961

H. R. GREGORY 2,966,699

RING ROLL PRESSES

Filed Oct. 16, 1956

3 Sheets-Sheet 2

INVENTOR
Harry Rex Gregory

By
Stevens, Davis, Miller & Mosher
Attorneys

Jan. 3, 1961   H. R. GREGORY   2,966,699
RING ROLL PRESSES

Filed Oct. 16, 1956   3 Sheets-Sheet 3

INVENTOR
Harry Rex Gregory

By Stevens, Davis, Miller & Mosher
ATTORNEYS

United States Patent Office 2,966,699
Patented Jan. 3, 1961

---

2,966,699

RING ROLL PRESSES

Harry Rex Gregory, Piffs Elm, Cheltenham, England, assignor to Coal Industry (Patents) Limited, London, England, a British company Filed Oct. 16, 1956, Ser. No. 616,157

Claims priority, application Great Britain Oct. 17, 1955

2 Claims. (Cl. 18—9)

This invention relates to ring-roll presses of the kind used in forming granular or other material into briquettes or other compressed forms and comprising one or more rolls located eccentrically with respect to one or more rings, the roll or rolls and the ring or rings rotating together and being arranged so as to trap and compress the material at high pressures whilst rotating.

In our Patent No. 2,860,957 is disclosed a method whereby binderless briquettes of high strength may be made by subjecting the material to be briquetted to a suitable degree of angular shear strain while under load.

An object of the invention is to provide an improved ring-roll press of the kind which is capable of producing from suitable materials briquettes which are denser and/or stronger than those produced in conventional ring-roll presses at similar pressures; the invention is envisaged as being particularly but not exclusively applicable to presses for briquetting coal and/or coal products.

According to the present invention a ring-roll press of the kind referred to is provided with means such that the peripheral speeds of the ring or rings and the roll or rolls are different from each other in the zone or zones in which the material is compressed. In this way owing to the difference in the speeds a suitable degree of angular shear strain under load is induced in the material. The ratio of the peripheral speeds may be between 1.04:1 and 1.40:1 but is preferably between 1.07:1 and 1.15:1. Both the ring or rings and the roll or rolls may be positively driven, for example by gearing, but any desired means may be adopted to permit control of the relative peripheral speeds of the ring or rings and the roll or rolls, and there may also be means such as variable speed gear boxes for varying and adjusting the said relative speeds. In a construction comprising two rolls co-operating with a single ring, for example, the rolls may be positively driven by gearing or other suitable means and the ring may be driven by the compressed material, and the required difference in the peripheral speeds of the ring and the rolls may be achieved by applying a braking force to the ring; an electric, hydraulic, or mechanical brake may be employed for this purpose. Alternatively both the ring or rings and the roll or rolls may be driven by hydraulic motors, each hydraulic motor being of controlled variable speed, for example by feeding them separately from variable delivery hydraulic pumps; this arrangement facilitates accurate control of the press. Hydraulic loading of the ring or rings and/or the roll or rolls for exerting the compressing force is preferred, although other loading means may operate satisfactorily in some conditions. It is important that there should not be excessive slip between the compressed material and the roll or between the material and the ring, and the invention provides means for preventing such excessive slip; such means may reside in the proper dimensioning and formation of the surfaces which engage the compressed material and/or the selection of the material forming such surfaces. If desired the surfaces may be provided with one or more annular ribs, and/or with wave-like formations, and/or with serrations, and/or with depressions or recesses. Further features of the invention appear from the following description and the accompanying drawings.

Figure 2:
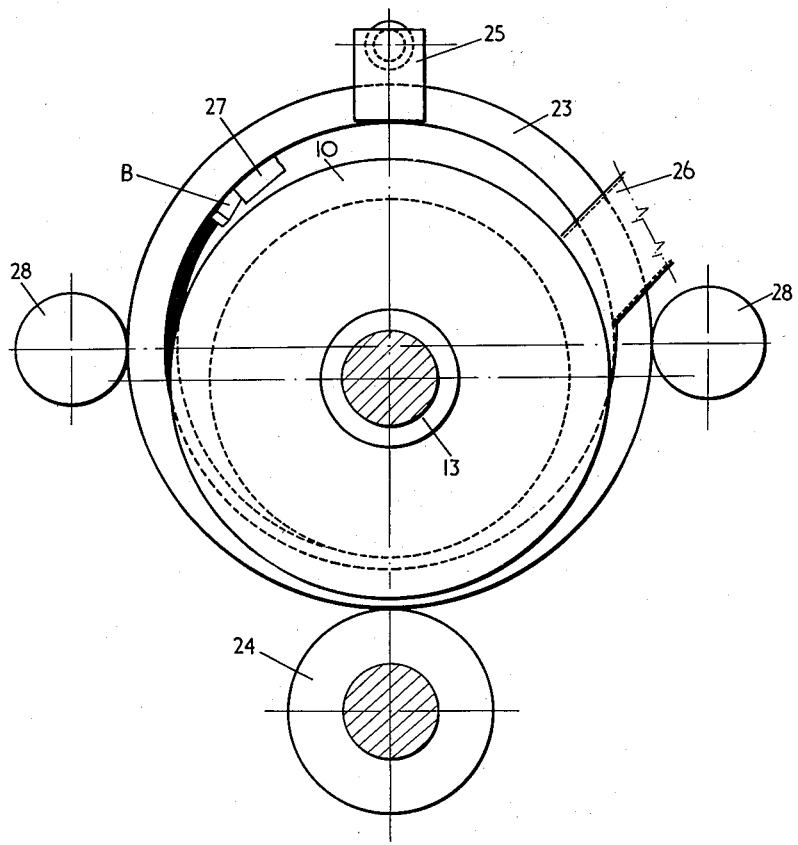
Figure 3:
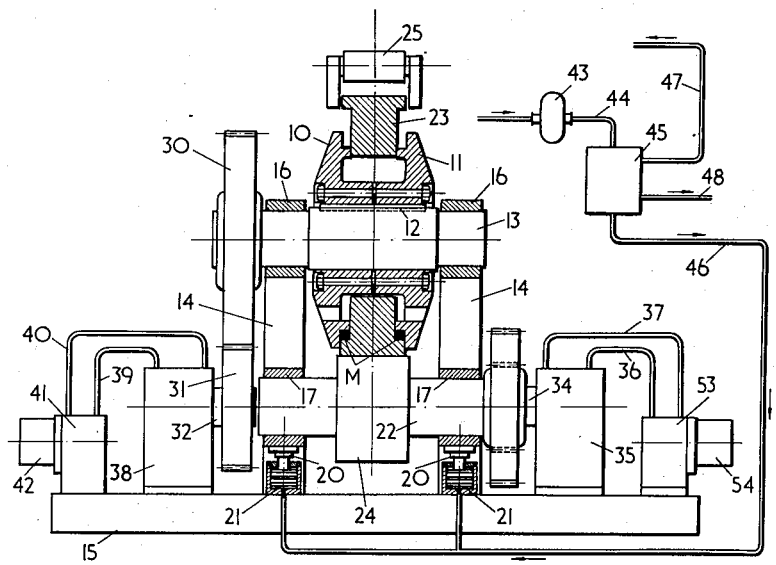
Figure 4:
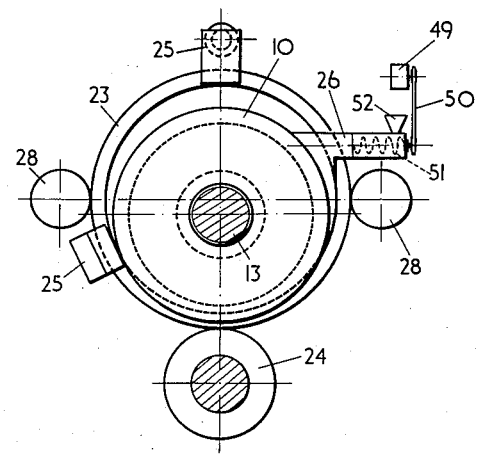

In the accompanying drawings the invention is illustrated diagrammatically and by way of example, Figure 1 being a partly diagrammatic sectional elevation of a press according to the invention, Figure 2 being a diagrammatic side elevation of some of the parts of the press of Figure 1, Figure 3 a partly diagrammatic sectional elevation of a second press according to the invention, and Figure 4 a diagrammatic side elevation of some of the parts of the press of Figure 3.

The press shown in Figures 1 and 2 comprises two rolls 10 and 11 which are secured by a key 12 to a shaft 13. The shaft 13 is supported by pillars 14 secured to a base 15, the pillars 14 being provided with bearings 16 for the shaft 13.

Two bearings 17 are movably mounted in slides 18 and 19 in the pillars 14. Two hydraulic rams 20 arranged in hydraulic cylinders 21 act on the bearings 17 to force them upwards with variable pressure. A shaft 22 is mounted in the bearings 17 and carries a backing roller 24 which engages a ring 23 which co-operates with the rolls 10 and 11. The ring 23 and rolls 10 and 11 are shaped to trap and compress the material M which is being briquetted. The ring 23 is guided by subsidiary rollers 28, and an electric or hydraulic brake 25 is arranged to act on the ring 23.

A feed chute 26 is arranged as shown in Figure 2, and through this chute the material to be briquetted is fed into the moulding spaces between the ring 23 and the rolls 10 and 11. Figure 2 also shows the location of a plough 27 by which the ribbon of briquette is diverted and broken up into briquettes B which are laterally discharged.

In operation the shaft 13 and rolls 10 and 11 are positively driven by any suitable means (for example in the manner hereinafter described with reference to Figure 3) and the ring 23 is driven by the material which is being compacted between the ring and the rolls. The brake 25 exerts a braking force on the ring 23 such that the peripheral speeds of the ring 23 and the rolls 10 and 11 are different from each other at the zones in which the material M is being compressed and owing to the difference in the peripheral speeds a suitable degree of angular shear strain under load is induced in the material so that a strong briquette results.

The construction illustrated in Figures 3 and 4 is similar in various respects to that described above with reference to Figures 1 and 2, like reference numerals being used to indicate like parts.

The rolls 10 and 11 shown in Figures 3 and 4 are secured to the shaft 13 carried in bearings 16 on pillars 14 secured to the base 15. The shaft 13 is connected by gear wheels 30, 31 to the shaft 32 of a hydraulic motor 38 which is connected by a feed pipe 39 and a return pipe 40 to a pump 41 driven by an electric motor 42. The motor 38 and pump 41 are mounted on the base 15.

A pump 43 is connected by a pipe 44 to a servo unit 45, and the latter is connected by a pipe 46 to the cylinders 21. The servo unit 45 is also connected by a pipe 47 to the pump 41 for the purpose of varying the delivery of the pump and thereby adjusting the speed of the motor 38 and the rolls 10 and 11.

A pipe 48 connects the servo unit 45 to the motor 49 shown in Figure 4, and this motor 49 through a belt 50 drives a screw feeder 51 in the feed chute 26 by which the material to be briquetted is fed into the spaces between the ring and the rolls. A hopper 52 serves for the supply of material to the screw feeder 51.

The ring 23 is driven by a friction or gear tooth backing roll 24, which may for instance be in the form of a pinion on shaft 22 connected to the shaft 34 of a hydraulic motor 35 connected by feed pipe 36 and return pipe 37 to pump 53 driven by a motor 54. Instead of or in addition to driving the ring 23 by means of the backing roll 24 it is possible to control the speed of the ring 23 by means of the brake 25.

The press shown in Figures 3 and 4 compacts the material in the manner described above with reference to Figures 1 and 2, but the servo unit 45 controls the speed of the press, the pressure of the braking roll 24, and the rate of feed of the material to the press so that a product of substantially uniform quality is produced.

I claim:

1. A ring-roll press of the kind referred to, comprising in combination at least one rotatable roll, means for driving said roll in rotation, at least one rotatable ring located eccentrically with respect to said roll and co-operating with said roll in compacting particulate material feed between said ring and said roll into a compacted mass, and braking means acting on said ring, the arrangement being such that said compacted mass transmits force from said roll to rotate said ring and said braking means retards said ring whereby said ring and said roll rotate together but with different peripheral speeds and create within said compacted mass an angular shear strain of not less than 15°.

2. A ring roll press of the kind referred to, comprising in combination at least one rotatable roll, at least one rotatable ring located eccentrically with respect to said roll and cooperating with said roll in compacting into a compacted mass particulate material fed between said ring and said roll, driving means for driving said roll and said ring in rotation, and retarding means operative to cause different rotational speeds of said roll and said ring, the arrangement being such that said compacted mass transmits rotational driving force between said roll and said ring, and said retarding means permit said ring and said roll to rotate together but with different rotational speeds to create within said compacted mass an angular shear strain of not less than 15°.

References Cited in the file of this patent
UNITED STATES PATENTS

| | | |
|---|---|---|
| 622,801 | Hoffmann | Apr. 11, 1899 |
| 1,844,972 | Parkhurst | Feb. 16, 1932 |
| 2,128,651 | Kohler | Aug. 30, 1938 |
| 2,412,299 | Snow | Dec. 10, 1946 |
| 2,558,693 | Roubal | June 26, 1951 |
| 2,689,976 | Hubmann | Sept. 28, 1954 |
| 2,689,977 | Hubmann | Sept. 28, 1954 |
| 2,742,668 | Hubmann | Apr. 24, 1956 |
| 2,798,253 | Rhodes | July 9, 1957 |